US011919583B2

(12) United States Patent
Roy et al.

(10) Patent No.: US 11,919,583 B2
(45) Date of Patent: Mar. 5, 2024

(54) OMNIWHEEL TRACK SYSTEM AND PLATFORM USING THE SAME

(71) Applicant: GESTION INOGEC INC., Sherbrooke (CA)

(72) Inventors: Raphael Roy, Saint-Denis de Brompton (CA); Benjamin Boiteau, Sherbrooke (CA); Vincent Roussel, Saint-Hyppolyte (CA); Vincent Labbé, Sherbrooke (CA)

(73) Assignee: GESTION INOGEC INC.

( * ) Notice: Subject to any disclaimer, the term of this patent is extended or adjusted under 35 U.S.C. 154(b) by 542 days.

(21) Appl. No.: 17/309,106

(22) PCT Filed: Oct. 25, 2019

(86) PCT No.: PCT/CA2019/051513
§ 371 (c)(1),
(2) Date: Apr. 23, 2021

(87) PCT Pub. No.: WO2020/082185
PCT Pub. Date: Apr. 30, 2020

(65) Prior Publication Data
US 2022/0009567 A1     Jan. 13, 2022

Related U.S. Application Data

(60) Provisional application No. 62/858,037, filed on Jun. 6, 2019, provisional application No. 62/750,581, filed on Oct. 25, 2018.

(51) Int. Cl.
*B62D 55/02* (2006.01)
*B62D 55/10* (2006.01)
(Continued)

(52) U.S. Cl.
CPC ............. *B62D 55/02* (2013.01); *B62D 55/10* (2013.01); *B62D 55/18* (2013.01); *B62D 55/32* (2013.01)

(58) Field of Classification Search
CPC ......... B62D 55/02; B62D 55/10; B62D 55/18
See application file for complete search history.

(56) References Cited

U.S. PATENT DOCUMENTS 6,179,073 B1 * 1/2001 Chhabra ................ B62D 55/08
180/9.1
8,540,038 B1 * 9/2013 Ullman ................. B60B 19/003
180/9.1

FOREIGN PATENT DOCUMENTS

CN     203078622 U  *  7/2013
DE        3138016 A1     4/1983
(Continued)

OTHER PUBLICATIONS

International Search Report and Written Opinion—Application No. PCT/CA2019/051513—dated Feb. 4, 2020.

*Primary Examiner* — Kevin Hurley
(74) *Attorney, Agent, or Firm* — LAVERY, DE BILLY, LLP; Gonzalo Lavin

(57) ABSTRACT

An omniwheel track system comprising a frame comprising at least one supporting plate, an endless drive mechanism mounted to the frame, and a plurality of segment assemblies mounted to the frame and drivable by the endless drive mechanism, the plurality of segment assemblies forming an endless track rotatable about the frame, each segment assembly comprising a housing adapted to receive at least one load wheel, each load wheel mounted to a corresponding segment assembly and rotatable about an axis, each axis forming an angle with a side of the housing. There is also provided an omniwheel track system platform comprising a plurality of the omniwheel track systems described above arranged on a (Continued)

main frame such that the omniwheel track system platform is movable omnidirectionally.

13 Claims, 11 Drawing Sheets

(51) Int. Cl.
*B62D 55/18* (2006.01)
*B62D 55/32* (2006.01)

(56) References Cited

FOREIGN PATENT DOCUMENTS

| EP | 2930088 A1 | 10/2015 | | |
|----|------------|---------|---|---|
| JP | 1143082 A | 2/1999 | | |
| WO | 2013021829 A1 | 2/2013 | | |
| WO | 2014043841 A1 | 3/2014 | | |
| WO | WO-2015016493 A1 * | 2/2015 | ............. | B60B 19/12 |

* cited by examiner

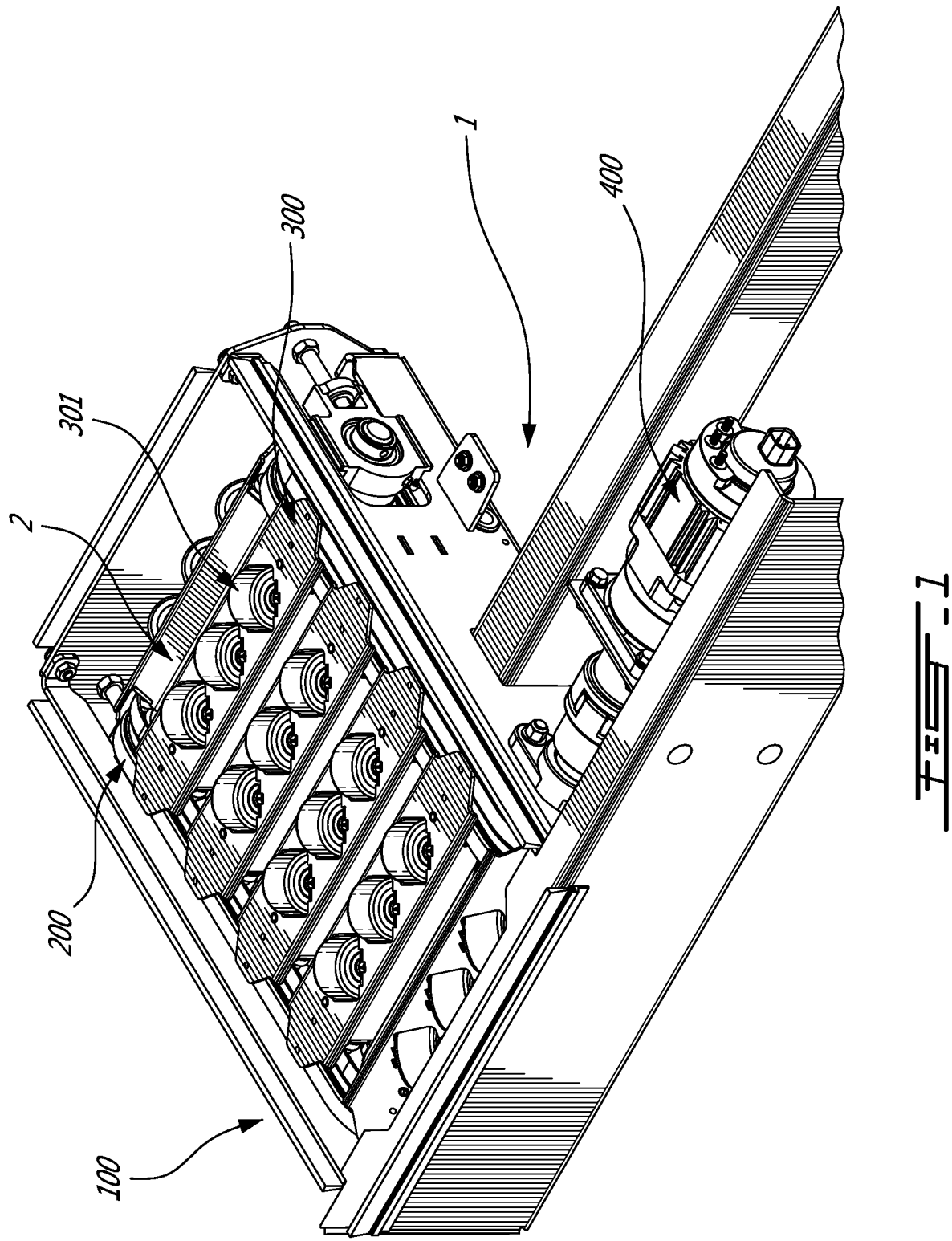

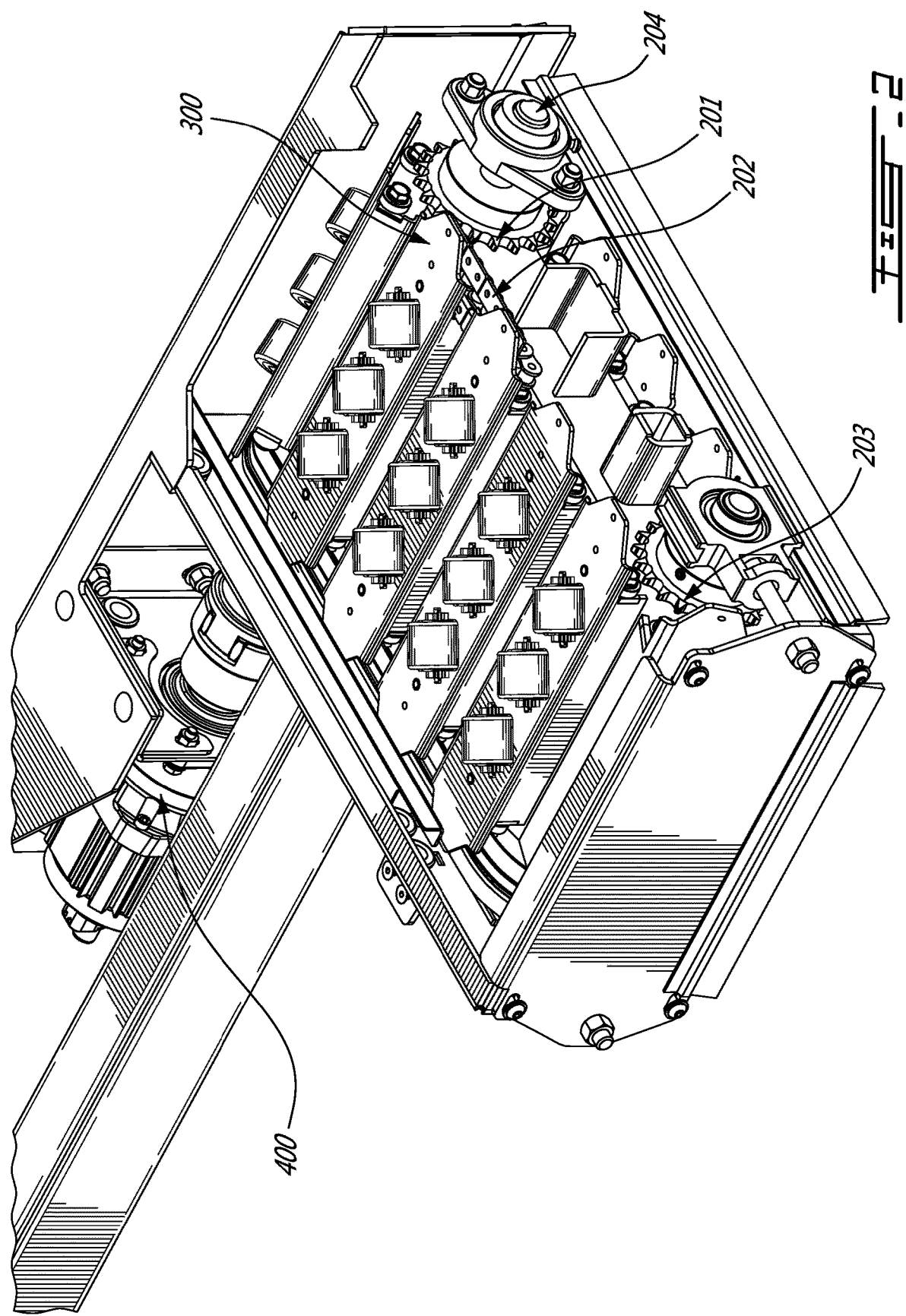

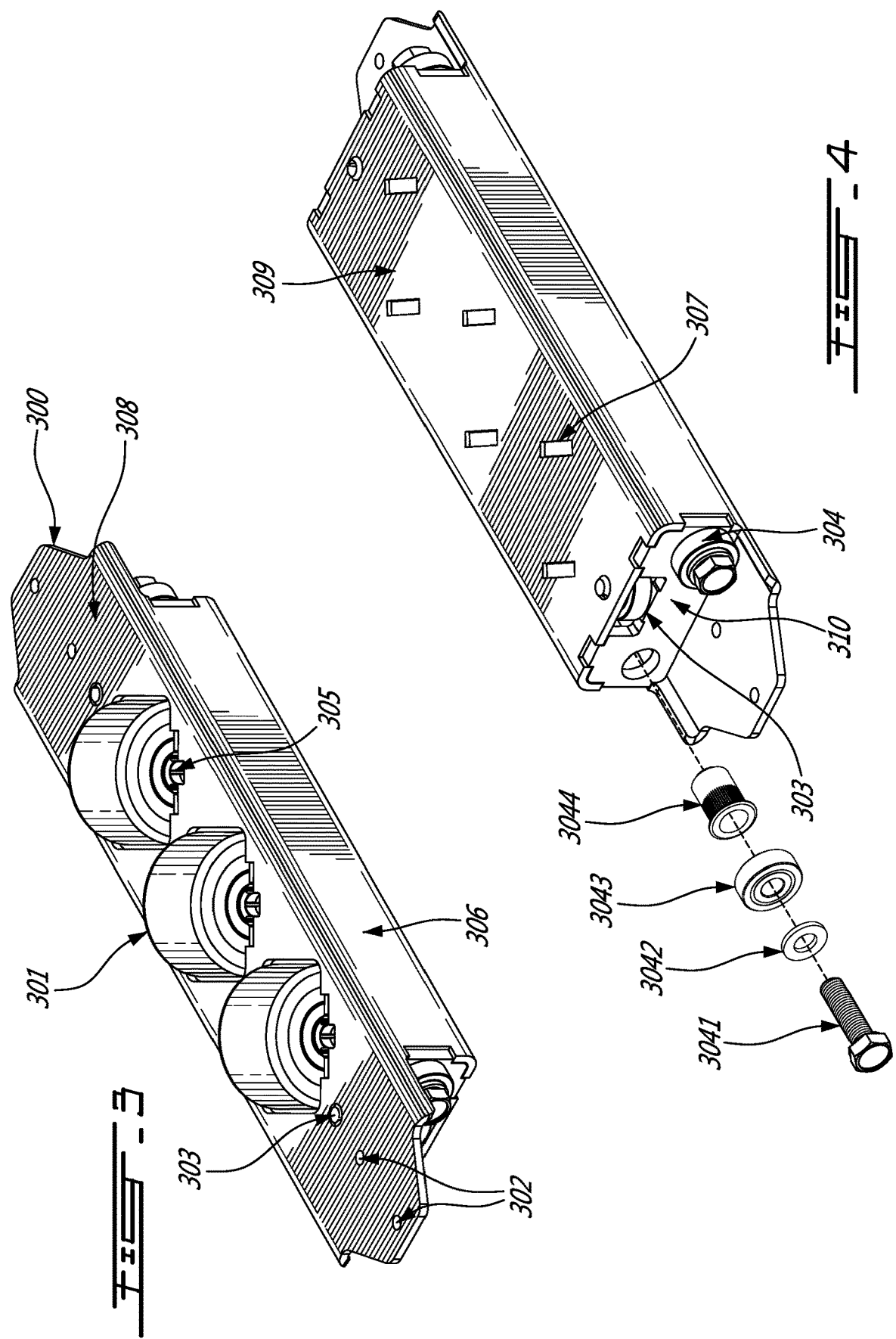

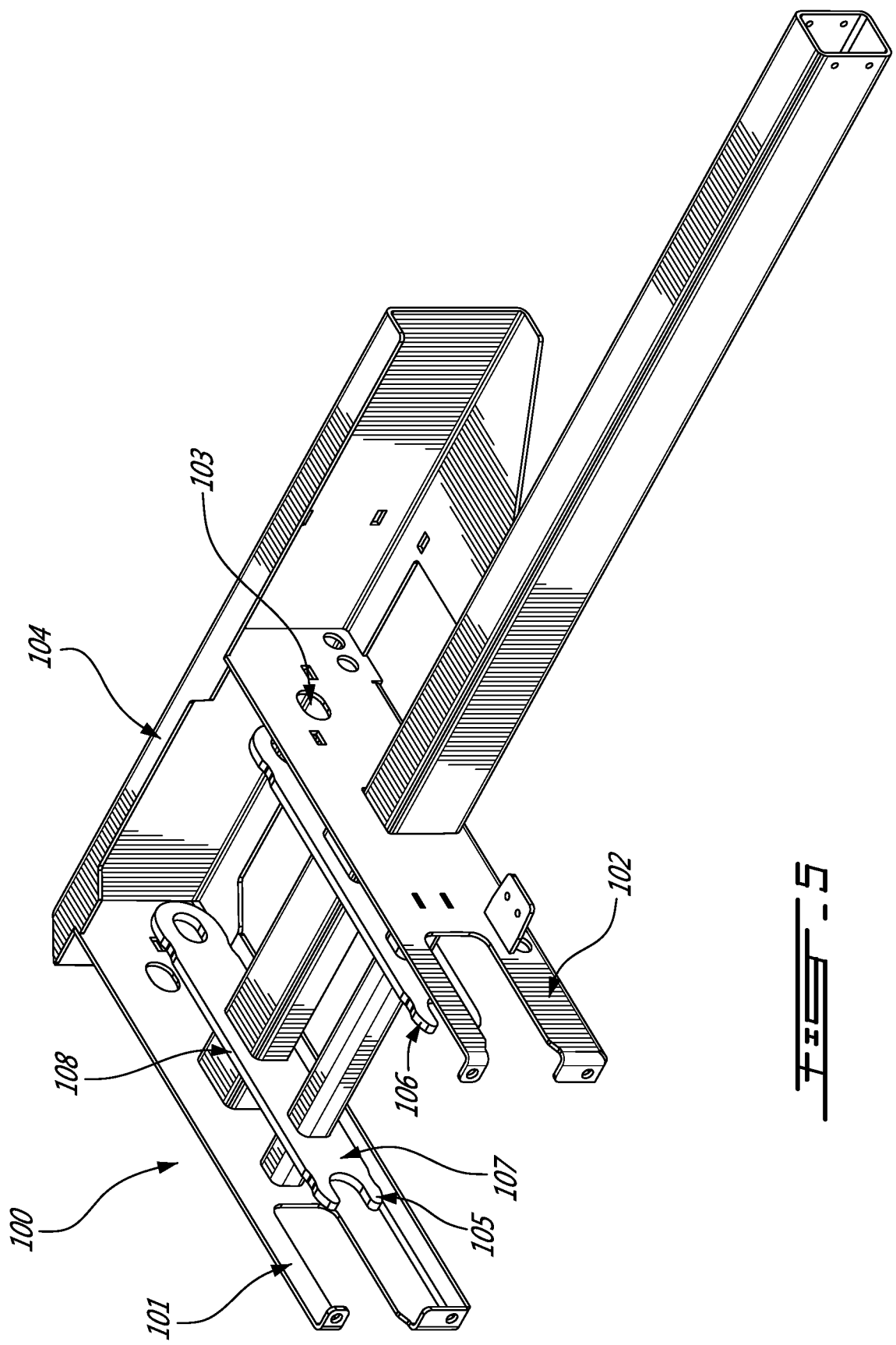

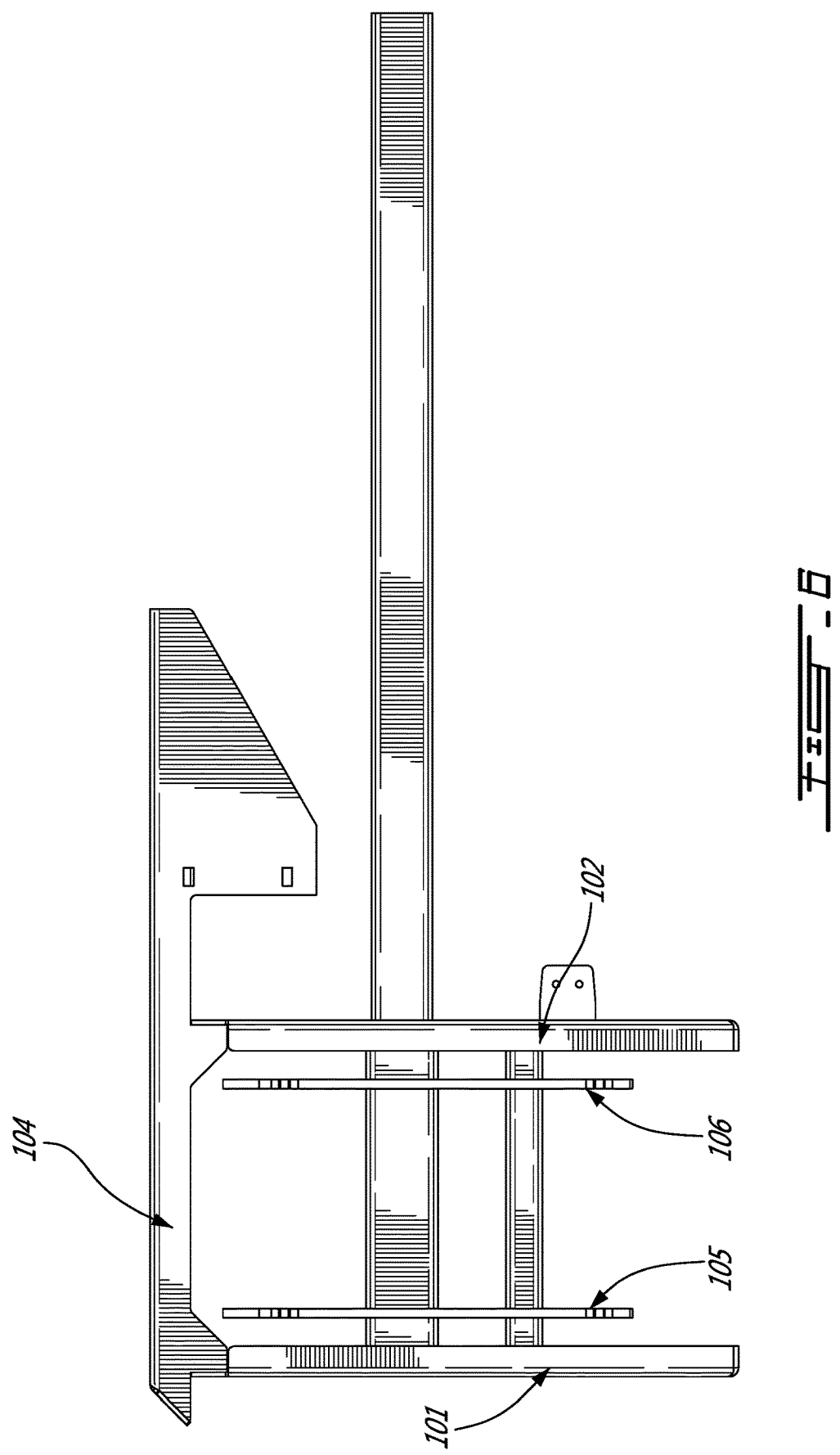

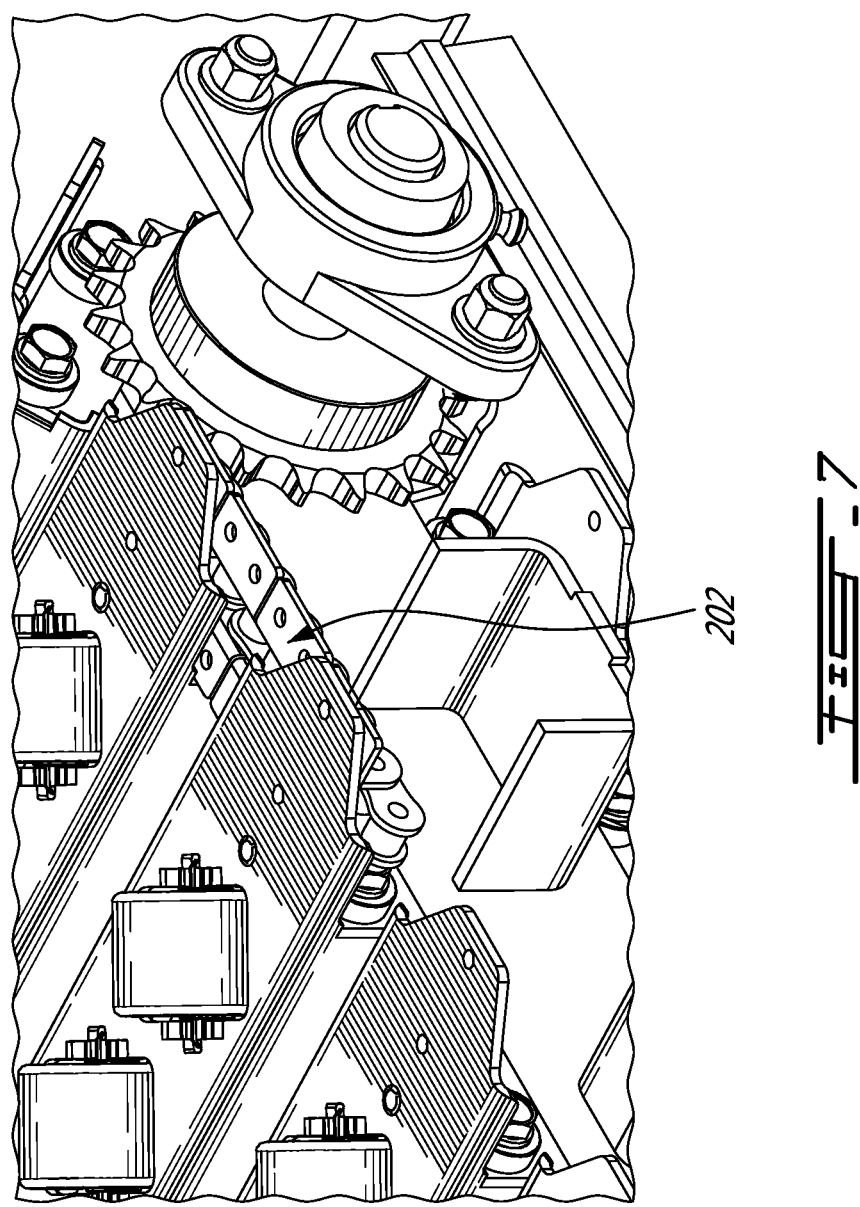

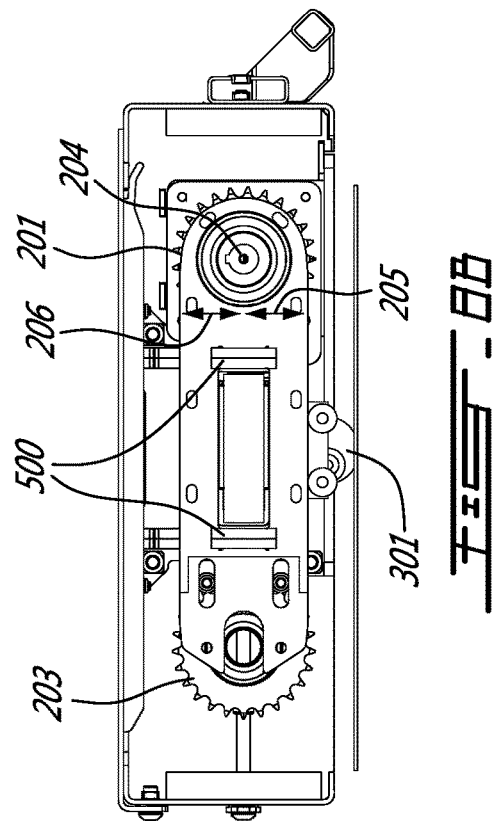
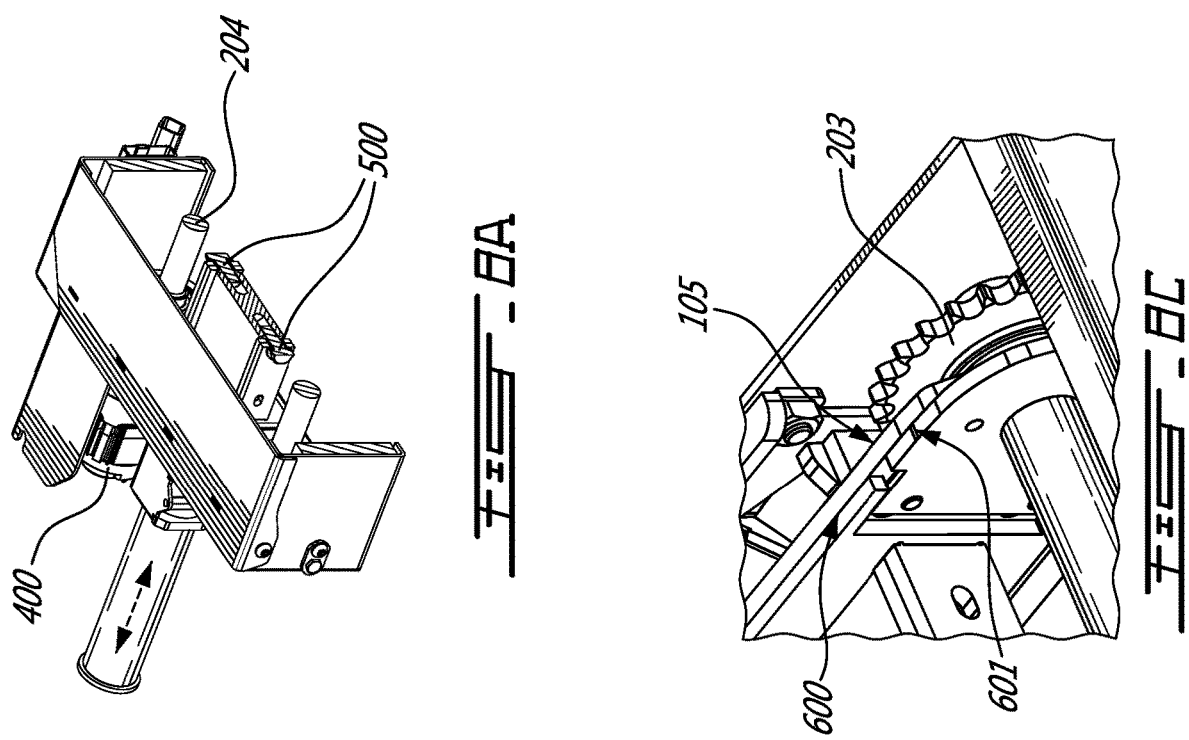

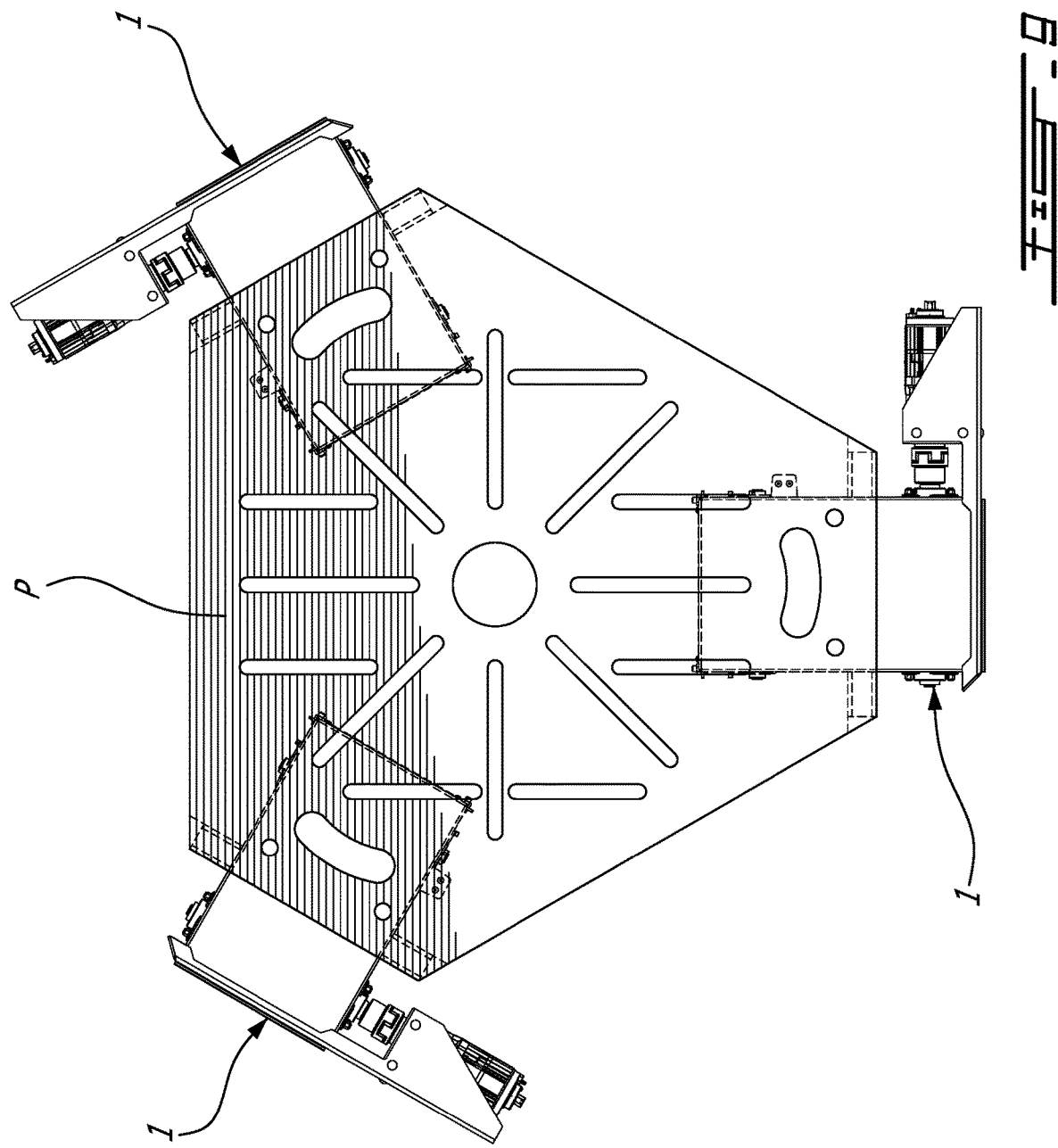

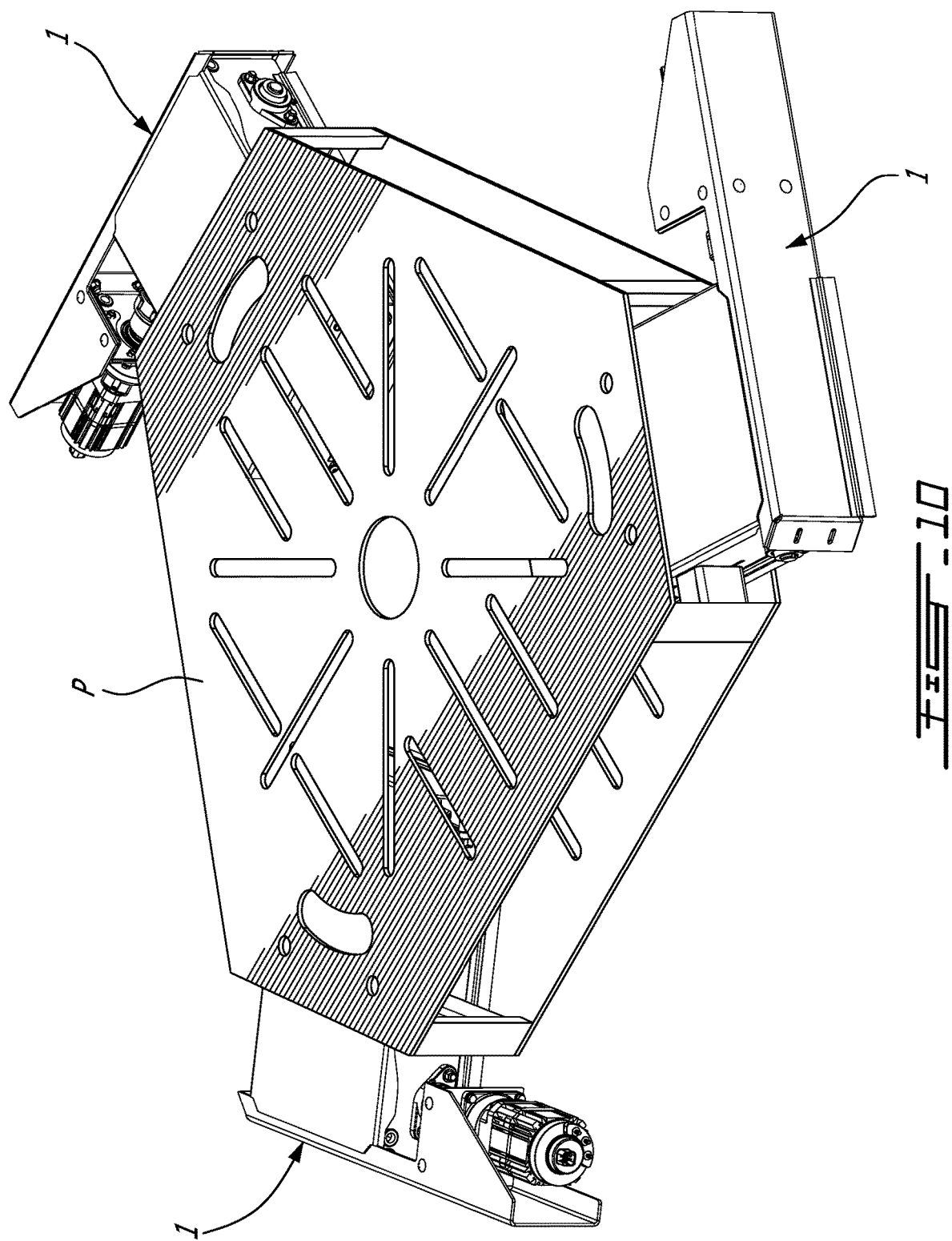

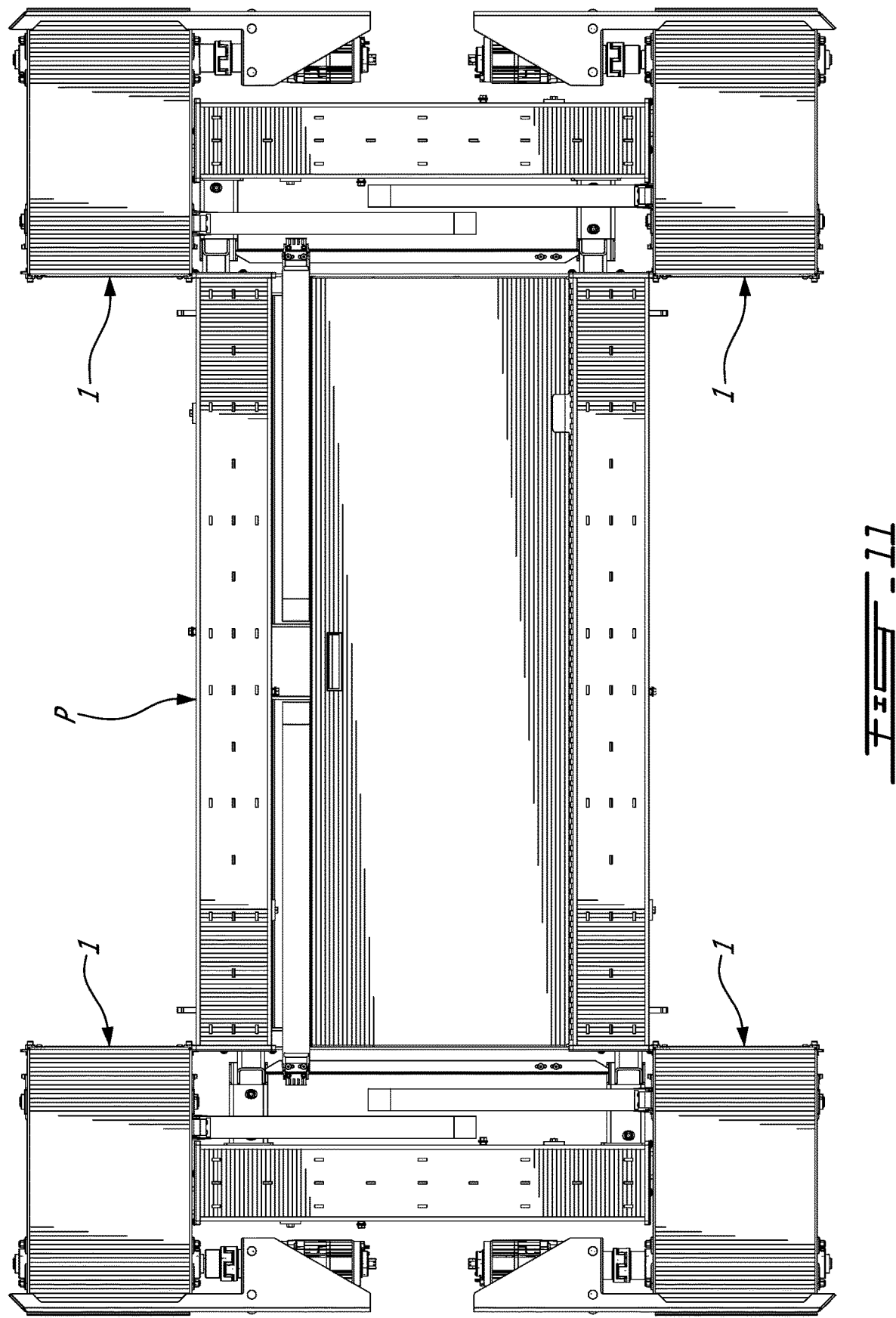

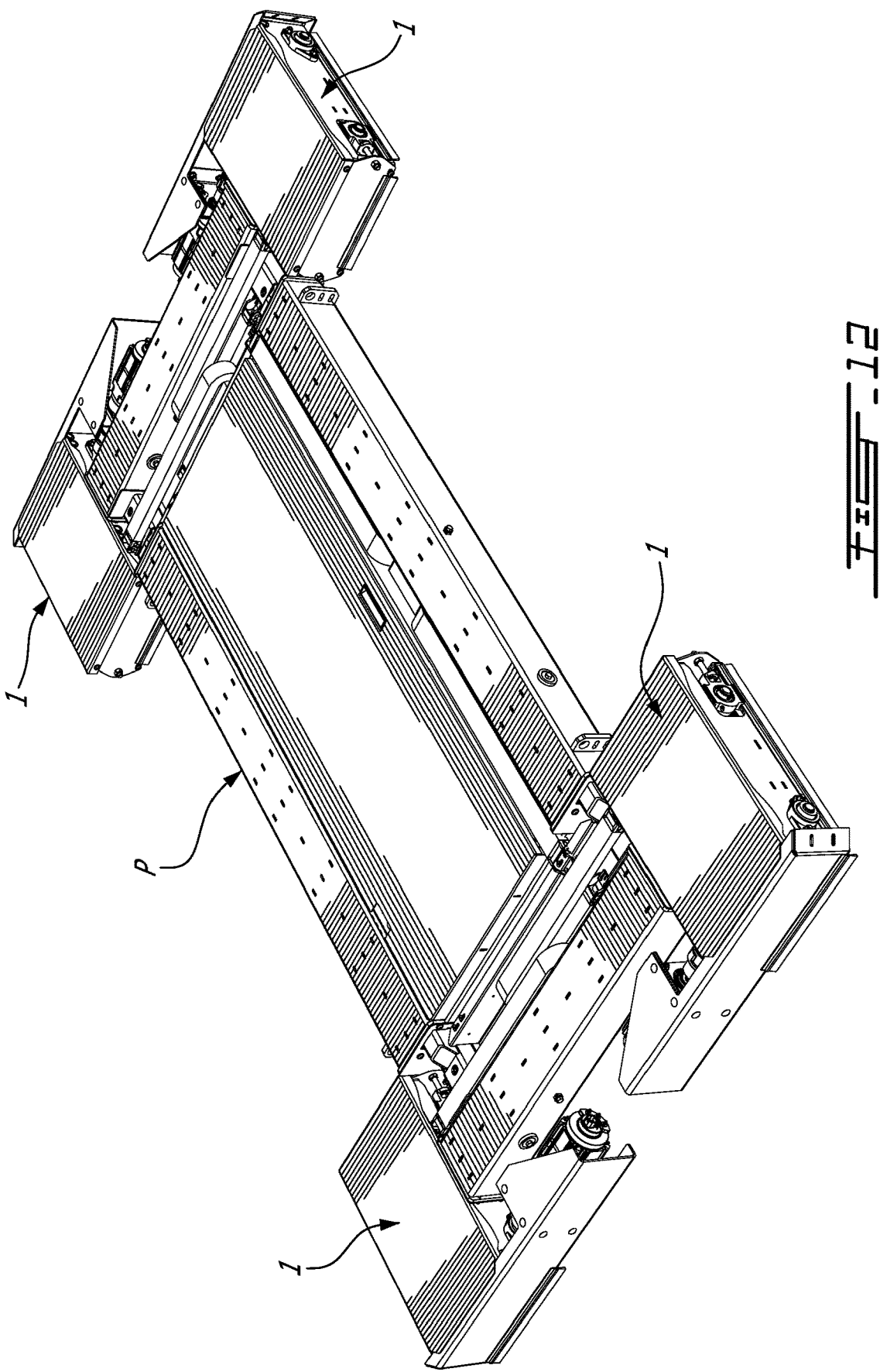

OMNIWHEEL TRACK SYSTEM AND PLATFORM USING THE SAME

CROSS-REFERENCE TO RELATED APPLICATION

This application is a National Entry Application of PCT application No. PCT/CA2019/051513 filed on Oct. 25, 2019 and published in English under PCT Article 21(2), which itself claims benefit of U.S. patent application Ser. No. 62/750,581, filed on Oct. 25, 2018 and U.S. patent application Ser. No. 62/858,037, filed on Jun. 6, 2019. All documents above are incorporated herein in their entirety by reference.

FIELD OF THE INVENTION

The present invention generally relates to the technical field of moving mechanical devices. More particularly, the present invention relates to the field of omniwheel track systems and platforms using omniwheel track systems having full range of motion characteristics.

BACKGROUND OF THE INVENTION

In recent years, mobile platforms have gradually played an important role in various industries, such as storage, manufacturing, transportation, military, and aerospace. According to their motion characteristics, mobile platforms can be divided into two types: full range track systems and non-full range track systems.

Conventionally, non-full range track systems have populated the market as there has been a lack of development of full range track systems. There are a number of drawbacks of non-full range track systems such as lack of convenience and an increased need for space to accomplish a task. Conversely, full range track systems offer many advantages such as the ability to operate in small and crowded spaces, the ability to freely travel, and the adaptability to situations requiring very precise positioning and high precision tracking.

Despite these advantages, the development of full range track systems has been lagging behind the development of non-full range track systems.

German patent application DE 3138016A1 (Stratmann) discloses a motor vehicle which may be moved in all directions in a directionally stable fashion. Such a vehicle comprises track plates, such as rollers, directly installed over sections of an endless band at an angle. The load of the vehicle is supported by sprockets and by endless band sections.

PCT patent publication WO 2014/043841A1 (Zhang) discloses a track type omnibearing moving platform. This platform comprises track assemblies having rollers mounted on a chain-liked endless band driven by sprocket wheels and rolling wheels. The load is thus supported by both the sprocket wheels and the rolling wheels. Some of the drawbacks of such a system are obvious. As an example, the direction of the load wheels of such a system tends to have reduced efficiency for horizontal loads.

European patent publication EP 2930088A1 (Uriarte) discloses a tracked vehicle comprising a track system having rollers installed at an angle on the endless track belt. The system comprises a controller adapted to control the movement of the endless track belts to move the vehicle in different directions.

There is thus a need for an improved omniwheel track system to overcome the drawbacks of the prior art systems.

There is also a need for an improved omniwheel track system allowing the splitting or dividing of the force created by the load to at least reduce the height of the resulting endless track system.

SUMMARY OF THE INVENTION

In order to overcome the above and other shortcomings, there is provided an omniwheel track system comprising a frame comprising at least one supporting plate, an endless drive mechanism mounted to the frame, and a plurality of segment assemblies mounted to the frame and drivable by the endless drive mechanism, the plurality of segment assemblies forming an endless track rotatable about the frame, each segment assembly comprising a housing adapted to receive at least one load wheel, each load wheel mounted to a corresponding segment assembly and rotatable about an axis, each axis forming an angle with a side of the housing.

In an embodiment, the endless drive mechanism comprises a motor, at least one drive wheel drivable by the motor via a rotating shaft, and at least one idler wheel drivable by the at least one drive wheel via an endless belt.

In an embodiment, each of the at least one drive wheel and at least one idler wheel is a sprocket and the endless belt is a chain.

In an embodiment, each of the at least one drive wheel and at least one idler wheel is a pulley and the endless belt is a belt.

In an embodiment, each segment assembly comprises at least three load wheels.

In an embodiment, at least one load wheel on each segment assembly is mounted to the segment assembly at an attachment point that is vertically offset from the remaining load wheels on the segment assembly.

In an embodiment, each segment assembly comprises a rotatably-mounted horizontal idling wheel configured to roll on a side of the endless drive mechanism.

In an embodiment, each segment assembly comprises a rotatably-mounted vertical idling wheel configured to roll on a side of the frame.

In an embodiment, the frame comprises a first supporting plate and a second supporting plate.

In an embodiment, each axis forms an angle of approximately 45 degrees with the side of the housing.

There is also provided an omniwheel track system platform comprising a plurality of the omniwheel track systems described above arranged on a main frame such that the omniwheel track system platform is movable omnidirectionally.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 1 is a bottom perspective view of an omniwheel track system in accordance with an illustrative embodiment of the present invention;

FIG. 2 is a top perspective view of the omniwheel track system of FIG. 1 shown with a sprocket-chain system;

FIG. 3 is a top perspective view of a segment assembly of the omniwheel track system of FIG. 1;

FIG. 4 is a bottom perspective view of the segment assembly of FIG. 3;

FIG. 5 is a perspective view of an embodiment of a frame of the omniwheel track system of FIG. 1;

FIG. 6 is a top view of the frame of FIG. 5;

FIG. 7 is a perspective view of various segments assemblies of FIG. 3 and a chain having two tabs of the sprocket-chain system of FIG. 2;

FIGS. 8A to 8C are respective perspective, side and detailed perspective views of an omniwheel track system, in accordance with another illustrative embodiment of the present invention;

FIGS. 9 and 10 are respectively a top view and a perspective view of a track system platform with three omniwheel track systems in a triangular configuration FIGS. 11 and 12 are respectively a top view and a perspective view of a track system platform with four omniwheel track systems in a rectangular configuration.

DETAILED DESCRIPTION OF THE PREFERRED EMBODIMENT

A novel omniwheel track system and platform using the same will be described hereinafter. Although the invention is described in terms of specific illustrative embodiments, it is to be understood that the embodiments described herein are by way of example only and that the scope of the invention is not intended to be limited thereby.

Referring first to FIG. 1, a first embodiment of an omniwheel track system 1 is illustrated. The omniwheel track system 1 includes a housing or frame 100 adapted to receive an endless track 2. The endless track 2 includes a plurality of segment assemblies or load links 300 driven by an endless driving mechanism 200, typically embodied as a belt or chain and two wheels or sprockets. In some embodiments, the segment assemblies 300 are connected to the driving mechanism 200 and are driven by a motor 400, such as an electric motor or a gear motor. As will be discussed in further detail below, a platform (not shown) including a plurality of omniwheel track systems 1 arranged on a main frame (not shown) can permit omnidirectional movement in a small area. In an embodiment, the system 1 is configured to be used without any motorization, which allows the system 1 to support a heavier load, without any constraints based on quantity or position.

Referring now to FIG. 2, in a typical embodiment, the driving mechanism 200 is shown as a sprocket-chain system. A drive wheel or sprocket 201 is pivotally connected to the frame 100 and is driven by the motor 400, typically by a shaft 204. Understandably, any other means to drive the drive wheel 201 may be used. The driving mechanism 200 further includes an idler wheel or sprocket 203 pivotally connected to the frame 100. An endless belt or chain 202 surrounds the drive wheel 201 and the idler wheel 203. The drive wheel 201 actuates the idler wheel 203 by the chain 202. In an embodiment, each of the drive wheel 201 and idler wheel 203 is a pulley and the endless belt 202 is a belt.

Still referring to FIGS. 1 and 2, in a typical embodiment, the frame 100 includes two sides, each side receiving an endless driving mechanism 200. In such an embodiment, each segment assembly 300 is attached at one end to a first of the endless chains 202 and at another end to second of the endless chains 202. In the embodiment shown in FIGS. 1 and 2, each end of the segment assembly 300 is attached to the top of the endless chain 202. In some embodiments, each drive wheel 201 is connected to the other drive wheel 201 via a shaft 204 driven by the motor 400. Such a configuration synchronizes the movement of each chain 202. In some embodiments, the idler wheels 203 may further be connected together via a shaft (not shown). A person of skill in the art would understand that any other known methods of driving the wheels may be used within the scope of the present invention. As an example, each omniwheel track assembly 1 may be driven by a motor 400 or all assemblies 1 could be driven by a single motor 400.

Now referring to FIGS. 3 and 4, an embodiment of a segment assembly 300 is illustrated in more detail. In some embodiments, the segment assembly 300 includes a housing 306 having a hollow structure adapted to receive at least one load wheel or roller 301. The housing 306 includes apertures each adapted to receive one or more load wheel 301. The load wheel 301 is pivotally mounted to the housing 306 to pivot or rotate about the axis 305. In some embodiments, the pivot axis 305 is mounted about the upper surface of the housing 306 so that a part of the load wheel 301 is within the housing 306 and the other part of the load wheel 301 protrudes out of the housing 306. In a preferred embodiment, the pivot axis 305 forms an angle with the side of the housing 306 to create an omniwheel effect.

Any number of load wheels 301 may be mounted on a segment assembly 300 according to the desired load to be applied on each track system and/or according to the dimensions of the housing 306. Preferably, each segment assembly 300 includes three load wheels 301 installed about a 45-degree angle. Understandably, other configurations using any number of load wheels 301 installed at different angles could be used within the scope of the present invention.

Still referring to FIG. 3, in an embodiment, the attachment points of one or more of the load wheels 301 to the segment assemblies 300 may be offset from the ground. Illustratively, on a segment assembly 300 with three load wheels 301, the center load wheel 300 may be positioned closer to the ground than the surrounding outer load wheels 300. As such, when a heavy load is applied to the load wheels 301, the bending of the segment assembly 300 causes the load distribution to be more uniform than if the attachment points of each load wheel 301 on a given segment assembly 300 were at the same height.

In an embodiment, a plurality of omniwheel track systems 1 may be attached to a main frame to form an omniwheel track system platform (not shown). Preferably, four omniwheel track systems 1 are mounted to each corner of the main frame, similarly to the configuration of a four-wheeled vehicle. In addition, a main frame capable of receiving a multiple of four track systems 1 could be used, for example with more than one omniwheel track system at each corner. In other embodiments, a main frame capable of receiving a multiple of track systems 1 other than four, for example six. A system 1 may also be combined with other types of systems, for example mecanum wheels, standard wheels or caster wheels.

To achieve the function of omnidirectional movement in a small area, each load wheel 301 in a segment assembly or load link 300 has a fixed bias angle. In such an embodiment, each load wheel 301 may freely rotate about its axis 305. In a preferred embodiment, each bias angle is in the range of (0°, 90°) or (−90°, 0°), typically ±45°. To ensure the ability to move in all directions, some track systems 1 of the platform may have positive bias angles while other track systems 1 may have negative bias angles. In a preferred embodiment, the bias angle of the first pair of track systems 1 have bias angles differing by about ±45° from the biasing angle of a second pair of track systems 1. In a typical platform, s first pair of track systems 1 is located on one side of the platform while a second pair of track systems 1 is located on the opposite side of the platform. In such an embodiment, the bias angle of the first pair of track systems 1 is diagonally opposed to the bias angles of the other pair of track systems 1. Thus, the angles of the opposing pairs of track systems 1 are inverted. For example, if the bias angle of the first pair of track systems 1 is 45°, the bias angle of the other pair of track systems 1 is −45°.

Preferably, each segment assembly 300 may be mass produced. In practice, if a segment assembly 300 is broken or needs maintenance, it may be easily replaced by detaching each of its ends from the endless driving mechanism 200. In some prior art systems, the presence of a complex endless belt typically requires the removal of the complete belt or chain to repair or maintain the system, requiring the track system platform to be stopped.

In a typical embodiment of the present invention, the housing 306 includes a top surface 308 and a bottom surface 309. While any known method may be used to mount the segment assembly 300 to the endless driving mechanism 200, in some embodiments, the wider portion of the top surface 308 includes at least one aperture 302 adapted to link or mount the top surface 308 to the endless drive mechanism 200 using a fastener or any other method known in the art, such as a bolt, nut or rivet. Understandably, one skilled in the art shall understand that any other known configuration of housing 306 may be used in the present invention.

In some embodiments, the bottom surface 309 of the housing 306 may include one or more apertures 307 adapted to receive or mount a support element (not shown). Such a support element is typically configured to allow for the installation of the load wheel 301. Understandably, the number and the dimensions of apertures 307 may vary according the structure supported by the support element and/or the number of load wheels 301 used.

In other embodiments, the housing 306 may include a bottom surface 309 having no aperture or may even be open (without bottom surface 309). In embodiments where the track system 1 is used to support lighter loads, housing 306 may simply include a single plate of an appropriate thickness.

In some exemplary embodiments, the bottom surface 309 may include three pairs of apertures 307, each pair being adapted to receive a support element configured to install one load wheel 301.

Referring now to FIG. 4, in an exemplary embodiment, the housing 306 may further include two side surfaces 310. The side surfaces 310 are generally maintained adjacent to the two chains or endless belts 202. Each side surface 310 may include one or more vertical idling wheels 303 pivotally mounted to the housing 306, typically pivoting about a substantially vertical axis (not shown). Such vertical idling wheels 303 are adapted to roll on one of the sides of the frame 100. Thus, the lateral loads applied on each segment assembly 300 are supported in part by the frame 100 rather than the chain 202. Understandably, the vertical idling wheels 303 may be mounted at other portions of the housing 306 as long as their positioning results in the same transfer of lateral forces. Understandably, the vertical wheels 303 and horizontal idling wheels 304 may be replaced by sliders or other low friction mechanisms that allow the load to be supported.

The housing 306 or side surfaces 310 thereof may further include one or more horizontal idling wheels 304. Each horizontal idling wheel 304 is generally pivotally mounted to a side surface 310 of the housing 306 about a generally horizontal axis (not shown) being substantially perpendicular to the chains 202. Such horizontal idling wheels 304 are generally adapted to roll on one of the top and/or bottom portions of a horizontal portion of the frame 100. The loads applied to the segment assembly 300 are thus supported completely or in part by the frame 100 rather than the chain 202.

An embodiment of a horizontal idling wheel 304 is shown in FIG. 4. The horizontal idling wheel 304 may include a bolt 3041, a washer 3042, a roller or bearing 3043 and a bushing 3044. Understandably, any other embodiment of a wheel or other known low friction mechanisms may be used without departing from the scope of the present invention.

The periphery of the vertical idling roller 303 is typically slightly protruding through the side surface 310 of the housing 306 of the segment assembly 300. Referring additionally to FIG. 5, such protuberance generally allows a periphery portion of the vertical idling roller 303 to contact the sidewall of supporting plates 105, 106 of frame 100. As such, when each segment assembly 300 is driven by the sprocket-chain system 200, the vertical idling roller 303 may easily roll along the sidewalls of the supporting plates 105, 106 (as shown in FIGS. 5 and 6). Preferably, each segment assembly 300 includes one vertical idling roller 303 and two horizontal idling wheels 304.

Referring now to FIGS. 5 and 6, the internal structure of an embodiment of the frame 100 for the track assembly 1 is shown. The frame 100 may be adapted to form a housing around the track system 1. In such embodiments, the frame 100 generally includes six plates 101, 102, 104 (top and bottom not shown). Understandably, any other configuration of the frame may be used or even configurations without a frame may be provided.

In a preferred embodiment, the frame 100 further includes one or more supporting elements or plates 105, 106. The dimensions and shape of the one or more supporting plates 105, 106 generally depend on the length of the endless driving mechanism 2 formed by the segment assemblies 300. The supporting plates 105, 106 typically include sidewall portions 107 and periphery portions 108. The sidewalls portions 107 are adapted to allow the vertical idling wheels 303 to roll on such a surface. The periphery portions 108 are adapted to allow the horizontal idling rollers 304 to roll on such a surface. Precisely, for installing each segment assembly 300 on the supporting plates 105, 106, the segment assembly 300 can be pressed so that it can been supported by the supporting plates 105, 106. In a preferred embodiment, the supporting plates 105, 106 are shaped as a rounded rectangle or an elongated circle to allow the chains 202 to move around the supporting plates 105, 106. Understandably, in other embodiments, the frame 100 may comprise only one supporting plate or more than two supporting plates and such supporting plates may have other shapes adapted to the desired configuration.

In other embodiments, the supporting plates 105 and 106 may form an assembly (not shown). Such an assembly may include wearing plates on the rolling surface of the supporting plates 105, 106. The assembly may also include elements to improve load balancing on the supported members 105, 106.

When the track system 1 forms part of a track system platform, increased loads may be supported on the system 1. The loads applied on the platform are divided between the horizontal idling wheels 304 and the vertical idling wheels 303 which are supported by contacting or rolling along the supporting plates 105, 106. The resulting lateral forces are supported by the vertical idling wheels 303 while the vertical forces are generally supported by the horizontal idling wheels 304. Such distribution of the forces allows the track system to support greater loads than in some prior art systems using similarly-sized wheels. Advantageously, each track system 1 may have a low height while supporting important loads.

Referring back to FIGS. 1 and 2, each segment assembly 300 is connected to two adjacent segment assemblies 300 to form an endless track 2. As explained above, in a typical embodiment, each end of each segment assembly 300 is attached to an endless belt or chain 202. The resulting endless belt 2 surrounds the idler wheel 203 and driving wheel 201. The endless belt 2 is also supported by the one or more supporting plates 105, 106, typically positioned in between a corresponding idler wheel 203 and driving wheel 201. When being driven by the driving wheel 201, the segment sections 300 are adapted to slide or roll along the supporting plates 105, 106. Such rolling or sliding aims to substantially increase the potential load capacity on the track assembly 1. Understandably, the supporting plates 105, 106 are solidly or rigidly mounted or attached to the frame of the vehicle. As a result, the load is supported by the driving and idler wheels 201 and 203 and the supporting plates 105, 106.

To limit the friction of the rolling or sliding of the segment assemblies 300 over the supporting plates 105, 106, each segment typically comprises a low friction mechanism, such as one or more idling wheels 303, 304. In embodiments having load wheels 301 pivotally mounted to the segment assembly 300, the one or more horizontal idling wheels 304 is adapted to roll over or under the periphery of the supporting plates 105, 106 and the one or more vertical idling wheels 303 are adapted to roll on the side or wall of the supporting plates 105, 106. Such idling wheels 303, 304 are each typically adapted to support high loads.

In some embodiments, the supporting plates 105, 106 are adapted to support loads on a bottom section only. In such an embodiment, the idling wheels 303, 304 roll on the surface only when passing under the bottom section of the supporting plates 105, 106.

In other embodiments, the low friction element or idling wheels 303, 304 may be located on the supporting plates 105, 106 themselves. In such embodiments, the endless belt or chain 202 is adapted to slide or roll on the supporting plates 105, 106 through the low-friction mechanism present on the supporting plates 105, 106.

Still referring to FIG. 5, the endless driving mechanism 200 typically surrounds the supporting plates 105, 106. A driving wheel 201 is preferably pivotally mounted at a first extremity of each supporting plate 105, 106 and an idler wheel 203 is preferably pivotally mounted at a second extremity of each supporting plate 105, 106. Such embodiments are adapted to receive loads on the segment assemblies 300 on the periphery 108 of the supporting plates 105, 106 and on the sidewalls 107 of the supporting plates 105, 106.

Referring now to FIGS. 2 and 7, there is an embodiment of the system 1 using a chain having attachment portions. In such an embodiment, each link of the chain 202 includes a portion adapted to be mounted to a segment assembly 300. In some an embodiment, this portion is typically in the form of a plate having apertures adapted to be welded or attached to corresponding apertures 302 of the side portions of each segment assembly 300.

Referring again to FIGS. 5 and 6, in some embodiments, the frame 100 may include apertures or passages 103 adapted receive the shaft 204 driven by the motor 400. Preferably, the side plates 101, 102 and the supporting plates 105, 106 include apertures or passages 103 being aligned to allow the mounting of the shaft 204.

Referring to FIGS. 1 to 6, the height of the omniwheel track system generally depends on the diameter of the driving wheel or sprocket 201.

Referring to FIG. 7, an embodiment of a method to mount a segment assembly 300 to a chain 202 is illustrated. The method comprises the steps of surrounding a chain 202 having mounting portions around a drive wheel 201 and an idler wheel 203. The method further comprises attaching an extremity of the segment assembly 300 to the mounting portions of the chain 202. The previous steps may be repeated to install additional chains 202.

Referring now to FIGS. 8A-8C, in an embodiment, the entire system 1 may be mounted on a double pivot 500 to ensure that the applied loads are distributed as evenly as possible on the load wheels 301. In another embodiment, in order to reduce the impacts of the load wheels 301 on the running surface, each segment assembly 300 includes a modified oval profile whereby a lower section 205 (between the shaft 204 and the ground) has a distance greater than that of an upper section 206. Such an arrangement allows the load wheels 301 smoothly contact the ground. In another embodiment, depending on the application and the environment of use, the load wheels 301 can be made from various materials. For example, if the system 1 is to be used indoors on a smooth surface, the load wheels 301 can be made of polyurethane, while if the system 1 is to be used outdoors, the load wheels 301 can be made of rubber. In yet another embodiment in which a chain 202 is used, a tensioner system 600 including a running surface 601 is also provided, which ensures that the load wheels 301 remain in contact with the support plate 105, regardless of the configuration of the tensioner system 600.

One or more omniwheel track systems 1 can be combined with a variety of different systems, such as motorization systems, automation systems, security systems, navigation systems, or modular systems. Such motorization systems may include electric systems (such as electric motor and drive, power supply with wires, wireless or batteries, wireless induction chargers, or wired chargers), combustion systems (such as gas systems), tanks or fuel containers, fuel supply systems, hydraulic systems (such as hydraulic motors with various sources of hydraulic power). Such automation systems may include industrial or personal computer (PC) and/or programmable logic controller (PLC) and/or multipoint control unit (MCU) systems (such as from inside/outside the vehicle and possibly connected to an enterprise resource planning (ERP) system and/or a vehicle fleet manager), human machine interface (HMI) systems (possibly connected to PC, PLC, MCU or ERP systems), battery management systems, voice recognition systems (micro and software), speaker systems, light emitting diode (LED) systems (addressable and configurable), electric transformer systems, industrial or other common communication networks and associated hardware (such as Ethernet, Ethernet IP, Ethercat, Profibus, Profinet, rs485, Bluetooth, ZigBee, Wi-Fi and Canbus), and in wiring to connect different systems (such as for power and control). Such security systems may include a safety scanner, safety PLC, safety encoders, laser safety, safety curtains, safety relays, or other safety industrial systems. Such navigation systems may include Lidar, cameras (such as for image or barcode recognition), industrial vision systems (such as a camera with an algorithm for recognizing a line and/or a tag, such as a QR tag, to obtain position information), stereoscopic camera, sensors (such as ultrasonic sensors, light and/or color sensors, infrared sensors, magnetic sensors and proximity sensors), remote control (physical/virtual remote such as for a computer, tablet or cellphone), or manual control (such as a steering wheel, joystick, or buttons on a vehicle). Such modular systems may include a quick connect system (such as mechanical or electrical), a custom central part, lift platforms, an extensible platform (length/width), a tie to take cars by the wheels, a crane, a robotic arm, specific tooling/worktable, or racking.

One or more omniwheel systems 1 may be used in various application sectors such as transportation (handling, industrial logistics indoors/outdoors), construction (lifting equipment such as a ceiling lift or cisolift), heavy machinery (tractor, excavator), the automotive industry (garage, dealer, show), the mining industry, the prefab house industry, the machining industry, or the metallurgical industry.

Referring to FIGS. 9 and 10, three omniwheel systems 1 may be mounted at 120 degrees from each other onto a platform P in a triangular configuration. As persons skilled in the art will understand, many other configurations may be achieved for different applications.

Referring to FIGS. 11 and 12, four omniwheel systems 1 are mounted at each corner of a platform P in rectangular configuration. As persons skilled in the art will understand, many changes to this configuration may be achieved for different applications.

In recent test results, embodiments of the present omniwheel system 1 have advantageously reduced the noise levels as compared to the noise levels produced by other known mobile platforms. For example, at a floor speed of 2 km/h an embodiment having an oval shape produced noise levels of less than 90 dB-A while other embodiments of the invention with different profiles have produced noise levels of less than 70 dB-A.

While illustrative and presently preferred embodiments of the invention have been described in detail hereinabove, the scope of the claims should not be limited by the preferred embodiments set forth in the examples, but should be given the broadest interpretation consistent with the description as a whole.

The invention claimed is:

1. An omniwheel track system (1) comprising:
a frame (100) comprising at least one supporting plate (105);
an endless drive mechanism (200) mounted to said frame (100); and
a plurality of segment assemblies (300) mounted to said frame (100) and drivable by said endless drive mechanism (200), said plurality of segment assemblies (300) forming an endless track (2) rotatable about said frame (100), each said segment assembly (300) comprising a housing (306) adapted to receive at least one load wheel (301), each said load wheel (301) mounted to a corresponding said segment assembly (300) and rotatable about an axis (305), each said axis (305) forming an angle with a side of said housing (306), wherein each said segment assembly (300) comprises at least one of a rotatably-mounted horizontal idling wheel (304) configured to roll on a side of said endless drive mechanism (200) and a rotatably-mounted vertical idling wheel (303) configured to roll on a side of said frame (100).

2. The omniwheel track system of claim 1, wherein said endless drive mechanism (200) comprises a motor (400), at least one drive wheel (201) drivable by said motor (400) via a rotating shaft (204), and at least one idler wheel (203) drivable by said at least one drive wheel (201) via an endless belt (202).

3. The omniwheel track system of claim 2, wherein each of said at least one drive wheel (201) and at least one idler wheel (203) is a sprocket and said endless belt (202) is a chain.

4. The omniwheel track system of claim 2, wherein each of said at least one drive wheel (201) and at least one idler wheel (203) is a pulley and said endless belt (202) is a belt.

5. The omniwheel track system of claim 1, wherein each said segment assembly (300) comprises at least three said load wheels (301).

6. The omniwheel track system of claim 5, wherein at least one said load wheel (301) on each said segment assembly (300) is mounted to said segment assembly (300) at an attachment point that is vertically offset from the remaining said load wheels (301) on said segment assembly (300).

7. The omniwheel track system of claim 1, wherein said frame (100) comprises a first supporting plate (105) and a second supporting plate (106).

8. The omniwheel track system of claim 1, wherein each said axis (305) forms an angle of approximately 45 degrees with said side of said housing (306).

9. An omniwheel track system platform (P) comprising a plurality of the omniwheel track system (1) of claim 1 arranged on a main frame such that said omniwheel track system platform is movable omnidirectionally.

10. The omniwheel track system platform (P) of claim 9, comprising at least three omniwheel track systems (1).

11. The omniwheel track system platform (P) of claim 9, comprising at least four omniwheel track systems (1).

12. A method of manufacturing an omniwheel track system (1) comprising:
mounting at least one supporting plate (105) on a frame (100);
mounting an endless drive mechanism (200) to said frame (100); and
mounting a plurality of segment assemblies (300) to said frame (100), said segment assemblies being drivable by said endless drive mechanism (200), said plurality of segment assemblies (300) forming an endless track (2) rotatable about said frame (100), each said segment assembly (300) comprising a housing (306) adapted to receive at least one load wheel (301), each said load wheel (301) mounted to a corresponding said segment assembly (300) and rotatable about an axis (305), each said axis (305) forming an angle with a side of said housing (306), wherein each said segment assembly (300) comprises at least one of a rotatably-mounted horizontal idling wheel (304) configured to roll on a side of said endless drive mechanism (200) and a rotatably-mounted vertical idling wheel (303) configured to roll on a side of said frame (100).

13. The method of claim 12, further comprising coupling a motor (400) to said endless drive mechanism (200), wherein at least one drive wheel (201) is drivable by said motor (400) via a rotating shaft (204), and at least one idler wheel (203) is drivable by said at least one drive wheel (201) via an endless belt (202).

* * * * *